Oct. 14, 1969  E. L. DAWE  3,472,090
SPROCKET WITH REPLACEABLE TOOTH SEGMENT
Original Filed Feb. 28, 1967
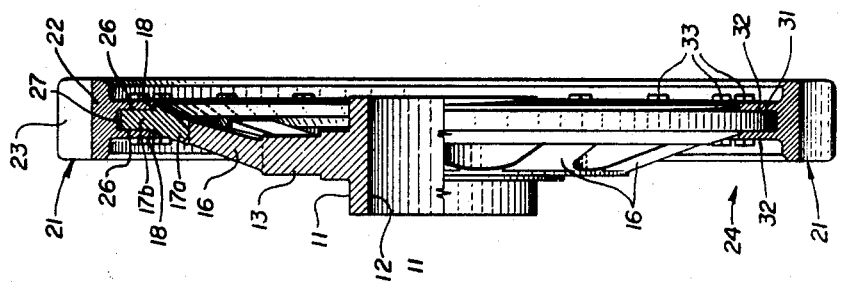
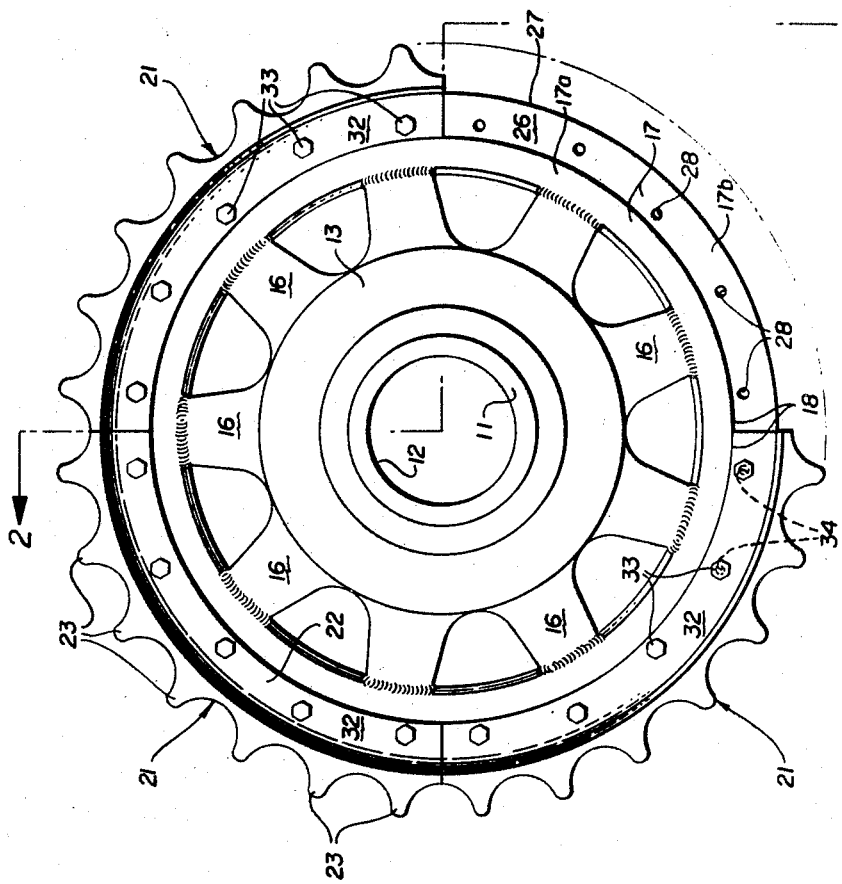
INVENTOR.
Ernest L. Dawe
BY Flehr, Hohbach, Test,
Albritton & Herbert
Attorneys

United States Patent Office 3,472,090
Patented Oct. 14, 1969

3,472,090
SPROCKET WITH REPLACEABLE
TOOTH SEGMENT
Ernest L. Dawe, 29145 Del Monte Drive,
Sun City, Calif. 92381
Continuation of application Ser. No. 619,232, Feb. 28, 1967. This application Nov. 25, 1968, Ser. No. 778,863
Int. Cl. F16h 55/04
U.S. Cl. 74—243                         1 Claim

ABSTRACT OF THE DISCLOSURE

A sprocket having an adapter ring with replaceable tooth segments mounted thereon.

---

This is a continuation of application Ser. No. 619,232, filed Feb. 28, 1967.

Background of the invention

This invention relates to sprockets having replaceable teeth. Sprockets with replaceable teeth have heretofore been provided as disclosed in United States Letters Patent 3,083,585. Such a construction, however, is not particularly adapted for use for the replacement of sprockets on crawler tractors and other large equipment where down time must be kept to a minimum. There is, therefore, a need for a new and improved sprocket with replaceable tooth segments and a method which is particularly adapted for installation on crawler tractors and other large apparatus.

Summary of the invention

The sprocket comprising the present invention consists of a hub. A continuous adapter ring is provided and means is provided for securing the adapter ring to the hub so that it is concentric with the hub and is fixed to the hub and moves with the hub. At least two toothed segments are provided. Cooperative means carried by the adapter and a tooth segment are utilized for securing the tooth segments to the ring.

In general, it is an object of the invention to provide a sprocket and method of the above character which can be installed on a crawler tractor with very little down time for the crawler tractor.

Another object of the invention is to provide a sprocket and method of the above character which can be utilized in conjunction with an exchange program.

Another object of the invention is to provide a sprocket and method of the above character which facilitates stocking of certain of the parts by dealers.

Additional objects and features of the invention will appear from the following description in which the preferred embodiments have been set forth in detail in conjunction with the accompanying drawings.

Brief description of the drawing

FIGURE 1 is an elevational view showing the sprocket incorporating the present invention.

FIGURE 2 is a cross-sectional view taken along the line 2—2 of FIGURE 1.

Description of the preferred embodiment

As shown in the drawing, the sprocket consists of a hub 11 which is provided with a centrally disposed bore 12 which is adapted to receive the shaft (not shown) on which the sprocket is to be mounted. An annular flange 13 is secured to the hub 11 and can be formed integral therewith as shown in FIGURE 2. It is readily apparent that, if desired, the flange 13 can be formed of separate parts and then secured to the hub by suitable means such as bolts. A plurality of spokes 16 are formed integral with the annular flange 13 and are spaced circumferentially around the annular flange 13 as shown particularly in FIGURE 1. As can be seen from FIGURE 2, the spokes 16 are inclined in an inward direction relative to the axis of the bore 12 as shown in FIGURE 2.

An adapter ring 17 is secured to the spokes 16 by a suitable means such as welding as shown in FIGURE 1. The adapter ring is provided with one portion 17a which is also inclined in the same direction as the spokes 16. It is also provided with another portion 17b which extends in a direction at right angles to the axis of the hole or bore 12. The adapter ring 17 is formed with a pair of shoulders 18 on opposite sides of the portion 17a and adjacent the root or base of the portion 17a.

At least two toothed segments 21 are provided and are secured to the adapter ring 17. Each of the toothed segments consists of an arcuate body 22 and a plurality of spaced teeth 23 which are formed on the body. Cooperative means 24 is provided for securing the toothed segments 21 to the adapter ring 17. In the embodiment of the invention shown in FIGURES 1 and 2, this cooperative means consists of the flange-like portion 17b which is provided with spaced substantially parallel side walls 26 and an outer annular surface 27 perpendicular to the side walls 26. A plurality of spaced holes 28 extend through the portion 17b and open through the side walls 26. An arcuate recess 31 is formed in each of the toothed segments 21. The arcuate recess 31 is substantially U-shaped in form and has the same configuration as the portion 17b, as shown in cross-section in FIGURE 2. This recess 31 is normally defined by substantially parallel deformable side walls 32. The arcuate recess 31 is such that a relatively tight fit is formed between the arcuate recess and the annular portion 17b of the adapter ring 17.

Removable securing means forms a part of the cooperative means and is provided for securing the arcuate toothed segments 21 to the adapter ring 17 and takes the form of bolts 33 which extend through holes 34 provided in the side walls 32 and the holes 28 provided in the adapter ring 17. As the bolts 33 are tightened, they serve to deform the deformable side walls 32 into continuous and substantial friction engagement with the side walls of the flange portion 17b to prevent the transmission of substantial shear forces to the bolts 33 during use of the sprocket.

This sprocket can be manufactured as a part of new equipment which, when the teeth 23 become worn, the tooth segments 21 can be readily replaced by removing the bolts 33. By utilization of the method herein described, a sprocket substantially identical to that shown in FIGURES 1 and 2 can be provided on equipment or apparatus which has already been manufactured and sold and has been used. By way of example, if it is assumed that the equipment has been manufactured with the sprocket teeth 23 being formed integrally with the spokes 16, these sprocket teeth can be removed by utilizing a cutting torch to separate the teeth from the sprocket to provide a hub with the flange 13 and the spokes 16 formed integral therewith. An adapter ring 17 can be welded thereon to be concentric with the bore 12. Toothed segments 21 can then be secured to the adapter ring 17 by the bolts 33 in the manner hereinbefore described.

It is possible for a dealer distributing apparatus which can utilize a sprocket of the type shown in the drawings to have in stock a hub 11 with the adapter ring 17 mounted on the spokes 16. This hub with the adapter ring can then be readily exchanged for the old sprocket removed from the apparatus. The teeth are then burned off the old sprocket and an adapter ring secured thereto in the same manner as hereinbefore described. The hub with the adapter ring mounted thereon can again be placed in stock ready for the next user.

By such an arrangement, it is possible to greatly reduce the down time of apparatus because it is merely necessary to remove the old sprocket and to substitute therefor a sprocket utilizing an adapter ring. After this first sprocket change has been made, it is only necessary for the operator in replacing the worn teeth to remove the bolts 33 and substitute therefor a new set of tooth segments 21.

Although the cooperative means 24 has been designed with the flange being provided on the adapter ring and the recess being provided in the tooth segments, it is readily apparent that, if desired, the recess could be provided in the adapter ring and the toothed portions could be provided with the flange adapted to fit into the recess.

I claim:

1. In a sprocket, a hub, a unitary and continuous adapter ring encircling the hub, said adapter ring having at least an annular portion thereof which is inclined at an angle with respect to the axis of the hub and having another annular portion which is at right angles with respect to the axis of the hub, means securing the adapter ring integrally to the hub so that it is concentric with the hub and is fixed to the hub, a plurality of toothed segments, each of said toothed segments having a pair of spaced side wall portions forming a recess therebetween and having said another annular portion of said adapter ring disposed within said recess and releasable means securing said toothed segments to said adapter ring to compress the side walls of the toothed segments into engagement with the adapter ring, said wall-like portions when mounted on said adapter ring forming substantially continuous annular portions on opposite sides of said another annular portion of the adapter ring.

References Cited

UNITED STATES PATENTS

| | | | |
|---|---|---|---|
| 402,448 | 4/1889 | Hersh et al. | 74—447 |
| 588,577 | 8/1897 | Humphreys | 74—243 |
| 688,570 | 12/1901 | Anthony et al. | 74—243 XR |
| 697,577 | 4/1902 | Wangerin | 74—244 |
| 1,206,172 | 11/1916 | Thomas. | |
| 1,378,156 | 5/1921 | Watts | 74—447 |
| 1,433,923 | 10/1922 | Anthony | 74—448 |
| 3,083,585 | 4/1963 | Dawe et al. | 74—243 |
| 3,111,859 | 11/1963 | Malone | 74—243 |
| 3,168,836 | 2/1965 | Militana | 74—243 |

FRED C. MATTERN, Jr., Primary Examiner

JAMES A. WONG, Assistant Examiner

U.S. Cl. X.R.

74—447, 448